United States Patent
Selden et al.

(10) Patent No.: US 11,407,268 B2
(45) Date of Patent: Aug. 9, 2022

(54) VARIABLE TRACKING ACTIVE SUSPENSION SYSTEM

(71) Applicant: ClearMotion Acquisition I LLC, Billerica, MA (US)

(72) Inventors: Brian Alexander Selden, Concord, MA (US); James A. Parison, New Ipswich, NH (US)

(73) Assignee: ClearMotion Acquisition I LLC, Billerica, MA (US)

( * ) Notice: Subject to any disclaimer, the term of this patent is extended or adjusted under 35 U.S.C. 154(b) by 461 days.

(21) Appl. No.: 16/424,268

(22) Filed: May 28, 2019

(65) Prior Publication Data

US 2019/0315180 A1   Oct. 17, 2019

Related U.S. Application Data

(63) Continuation of application No. 15/907,964, filed on Feb. 28, 2018, now Pat. No. 10,464,387, which is a
(Continued)

(51) Int. Cl.
*B60G 17/015* (2006.01)
*B60G 17/02* (2006.01)
(Continued)

(52) U.S. Cl.
CPC ... *B60G 17/0157* (2013.01); *B60G 17/01908* (2013.01); *B60G 17/01933* (2013.01);
(Continued)

(58) Field of Classification Search
CPC .............................. B60N 2/501; B60N 2/505
See application file for complete search history.

(56) References Cited

U.S. PATENT DOCUMENTS 5,387,913 A * 2/1995 Park .................. H03J 5/0272
341/155
5,467,266 A * 11/1995 Jacobs .................. B60J 1/2016
160/1
(Continued)

FOREIGN PATENT DOCUMENTS

| EP | 1 060 916 A2 | 12/2000 |
| EP | 2 431 218 A1 | 3/2012 |
| WO | WO 99/24274 A1 | 5/1999 |

OTHER PUBLICATIONS

International Search Report and Written Opinion for International Application No. PCT/US2015/059700, dated Feb. 1, 2016.
(Continued)

*Primary Examiner* — Peter D Nolan
*Assistant Examiner* — Ce Li Li
(74) *Attorney, Agent, or Firm* — Wolf, Greenfield & Sacks, P.C.

(57) ABSTRACT

An active suspension system for a sprung mass that is supported and movable relative to an unsprung mass. The active suspension system has a suspension that comprises an electromagnetic actuator that is adapted to produce an arbitrary force on the sprung mass that is independent of the position, velocity and acceleration of the sprung mass, a control system that provides control signals that cause the suspension to exert force on the sprung mass, to control the position of the sprung mass relative to the unsprung mass, wherein the control system implements a control algorithm with one or more constants, and a user interface that is operable to cause a change of one or more of the control algorithm constants so as to vary how closely motion of the sprung mass follows motion of the unsprung mass.

20 Claims, 4 Drawing Sheets

Related U.S. Application Data continuation of application No. 15/476,869, filed on Mar. 31, 2017, now abandoned, which is a continuation of application No. 14/537,261, filed on Nov. 10, 2014, now Pat. No. 9,643,467.

(51) Int. Cl.
   *B60G 17/019* (2006.01)
   *B60N 2/50* (2006.01)
   *F16F 15/00* (2006.01)

(52) U.S. Cl.
   CPC ............. *B60G 17/02* (2013.01); *B60N 2/501* (2013.01); *B60N 2/502* (2013.01); *F16F 15/00* (2013.01)

(56) References Cited

U.S. PATENT DOCUMENTS

| | | | | |
|---|---|---|---|---|
| 6,000,703 | A * | 12/1999 | Schubert | B60G 17/0165 180/89.12 |
| 6,035,980 | A * | 3/2000 | Fujita | F16F 6/005 188/267 |
| 6,311,110 | B1 * | 10/2001 | Ivers | F16F 9/48 280/5.501 |
| 7,195,250 | B2 | 3/2007 | Knox et al. | |
| 7,434,816 | B2 | 10/2008 | Knox et al. | |
| 7,694,946 | B2 * | 4/2010 | Shoemaker | B60N 2/505 267/140.15 |
| 7,878,510 | B2 | 2/2011 | Knox et al. | |
| 7,887,033 | B2 * | 2/2011 | Shoemaker | B60N 2/508 267/136 |
| 7,983,813 | B2 * | 7/2011 | Ummethala | B60N 2/507 701/37 |
| 8,095,268 | B2 | 1/2012 | Parison et al. | |
| 8,401,740 | B2 * | 3/2013 | Hiemenz | F16F 15/002 701/45 |
| 8,517,395 | B2 | 8/2013 | Knox et al. | |
| 8,725,351 | B1 | 5/2014 | Selden et al. | |
| 8,781,681 | B2 | 7/2014 | Parison, Jr. et al. | |
| 8,948,968 | B2 | 2/2015 | Knox et al. | |
| 9,643,467 | B2 | 5/2017 | Selden et al. | |
| 2002/0148317 | A1 * | 10/2002 | Onodera | G05G 9/10 74/471 XY |
| 2004/0089488 | A1 * | 5/2004 | Bremner | B60N 2/0232 180/89.13 |
| 2005/0242532 | A1 * | 11/2005 | Deo | B60G 17/021 280/5.5 |
| 2006/0004492 | A1 * | 1/2006 | Terlson | F24F 11/30 700/276 |
| 2006/0095180 | A1 * | 5/2006 | Ummethala | B60N 2/544 701/37 |
| 2006/0215406 | A1 * | 9/2006 | Thrailkill | A61B 1/00039 362/249.06 |
| 2007/0278025 | A1 * | 12/2007 | Shoemaker | B60N 2/525 180/89.13 |
| 2007/0278723 | A1 * | 12/2007 | Shoemaker | B60N 2/501 267/131 |
| 2008/0156602 | A1 * | 7/2008 | Hiemenz | B60N 2/508 188/267.1 |
| 2009/0248246 | A1 * | 10/2009 | Parison, Jr. | B60N 2/505 701/37 |
| 2010/0179730 | A1 * | 7/2010 | Hiemenz | B60N 2/502 701/45 |
| 2011/0024601 | A1 * | 2/2011 | Shoemaker | B60N 2/525 248/636 |
| 2013/0275006 | A1 * | 10/2013 | Ystueta | B60N 2/0244 701/49 |
| 2014/0220545 | A1 | 8/2014 | Sangetmano, II et al. | |
| 2014/0225408 | A1 * | 8/2014 | Scully | B60N 2/502 297/344.21 |
| 2017/0203627 | A1 | 7/2017 | Selden et al. | |
| 2018/0186209 | A1 | 7/2018 | Selden et al. | |

OTHER PUBLICATIONS

[No Author Listed] Active Suspension System. Sears Seating. http://www.searseating.com/technology/innovations, 2 pages [last accessed Apr. 26, 2015].

* cited by examiner

VARIABLE TRACKING ACTIVE SUSPENSION SYSTEM

CROSS-REFERENCE TO RELATED APPLICATIONS

This application is a continuation of U.S. application Ser. No. 15/907,964, filed Feb. 28, 2018, which is a continuation of U.S. application Ser. No. 15/476,869, filed Mar. 31, 2017, which is a continuation of U.S. application Ser. No. 14/537,261, filed Nov. 10, 2014, the contents of each of which are incorporated herein by reference in their entirety.

FIELD

This disclosure relates to an active suspension system.

BACKGROUND

Active suspension systems are used to counteract unwanted motions of a sprung mass. One such sprung mass is the seat of a motor vehicle. Drivers can experience significant fatigue due to constant seat vibration. Other motions of the seat can also be uncomfortable or even dangerous. Fatigue and seat-motion related issues can be lessened with an active suspension system that reduces seat vibration and other unwanted motions of the seat.

SUMMARY

An active suspension system can be used to counteract unwanted motions of a sprung mass, such as a vibration isolation platform and other masses that are coupled to the platform. An active suspension system uses one or more electromagnetic actuators that can provide an essentially linear output motion to help accomplish a desired suspension result. Examples of such electromagnetic actuators include linear motors and rotary motors that drive a transmission mechanism that converts rotary motion to linear motion. Some such active suspension systems, for example truck seat active suspension systems, use a bias force eliminator such as a dynamically adjustable spring element to eliminate the bias force, and an electromagnetic actuator such as a linear or rotary motor to counteract vibration and other sources of minor vertical accelerations.

Active suspension systems for motor vehicle seats move the seat up and down relative to the floor. Some systems also move the seat backward and forward and/or left and right. If the seat moves relative to the floor, the user's legs which span the distance between the seat and the floor will have induced motion. The user can be quite sensitive to this, and it can cause the user to expend energy in order to keep their feet on the control surfaces of the vehicle (e.g., gas, brake and clutch pedals) as the seat moves. Different individuals have different sensitivity to this and may prefer different amounts of relative motion of the seat. Also, on rough roads or singular large events the seat can move all the way down or all the way up in its travel. "Bottoming out" of the seat can be uncomfortable and unnerving. The present variable tracking active suspension system gives the user (who is typically but not necessarily the driver of a motor vehicle) control over how closely the motion of the sprung mass (e.g., seat) follows the motion of the unsprung mass (e.g., the floor of a motor vehicle). The user can thus choose an amount of leg motion versus vibration isolation that is comfortable for the user, and/or that is best for a particular roadway or a particular driving situation.

In one aspect, a variable tracking active suspension system for a sprung mass that is supported and movable relative to an unsprung mass includes a suspension that comprises an electromagnetic actuator that is capable of producing an arbitrary force (up to a maximum actuator force limit) on the sprung mass. The force produced by the electromagnetic actuator is largely independent of the position, velocity and acceleration of the sprung mass; the actuator output force does have some velocity dependence at high velocities but the force is not velocity dependent over much or all of the typical operational velocity range of the actuator when used as part of a motor vehicle seat suspension system. There is a control system that provides control signals that cause the suspension to exert force on the sprung mass, to control the position of the sprung mass relative to the unsprung mass, wherein the control system implements a control algorithm with one or more constants. There is also a user interface that is operable to cause a change of one or more of the control algorithm constants so as to vary how closely motion of the sprung mass follows motion of the unsprung mass.

Embodiments may include one of the following features, or any combination thereof. The suspension may further include a bias force eliminator. The bias force eliminator may comprise a dynamically-adjustable spring element. The sprung mass may include a seat of a motor vehicle, and the unsprung mass may include a floor of the motor vehicle. The user interface may be operable to cause a variation of how closely motion of the sprung mass follows motion of the unsprung mass, but only at relatively low frequencies of motion of the unsprung mass. Such relatively low frequencies may comprise frequencies of no more than about 10 Hz, or possible no more than about 1 or 2 Hz.

Embodiments may include one of the following features, or any combination thereof. The suspension system may further include a first sensor that senses a position of the sprung mass relative to the unsprung mass and provides a position signal to the control system. The first sensor may comprise a position sensor. The suspension system may further comprise a second sensor that senses an acceleration of the sprung mass relative to the unsprung mass and provides an acceleration signal to the control system. The control system may comprise a position loop that is involved in controlling the position of the sprung mass relative to the unsprung mass. The control algorithm may comprise proportional and derivative constants in the position loop. The user interface may be operable to change the proportional and derivative constants in the position loop.

Embodiments may include one of the following features, or any combination thereof. The user interface may define at least two presets, one preset operable to change the control signals such that the motion of the sprung mass closely follows the motion of the unsprung mass, and a second preset operable to change the control signals such that the motion of the sprung mass less closely follows the motion of the unsprung mass. The user interface may define three presets, each preset operable to change the control signals such that the motion of the sprung mass follows the motion of the unsprung mass to a different degree. The user interface may comprise a separate user-operable button for each preset.

In another aspect, an active suspension system for a seat of a motor vehicle that is supported and movable relative to a floor of the motor vehicle includes an electromagnetic actuator that is capable of producing an arbitrary force on the seat that is independent of the position, velocity and acceleration of the seat, a control system that provides control signals that cause the electromagnetic actuator to exert force on the seat to control the position of the seat relative to the floor, wherein the control system implements a control algorithm with a position loop that is involved in controlling the position of the seat relative to the floor, wherein the control algorithm comprises proportional and derivative constants in the position loop, a position sensor that senses a position of the seat relative to the floor and provides a position signal to the control system, a second sensor that senses an acceleration of the seat relative to the floor and provides an acceleration signal to the control system, and a user interface that is operable to cause a change of the proportional and derivative constants in the position loop so as to vary how closely motion of the seat follows motion of the floor, but only at frequencies of motion of the floor of no more than about 10 Hz, wherein the user interface defines at least two presets, one preset operable to cause a change of the proportional and derivative constants such that the motion of the seat closely follows the motion of the floor, and a second preset operable to cause a change of the proportional and derivative constants such that the motion of the seat less closely follows the motion of the floor.

Other features and advantages will become apparent from the following description and claims.

DETAILED DESCRIPTION

It is desirable to provide the driver of a motor vehicle that has an active seat suspension system the ability to alter how closely the motion of the seat follows the motion of the floor. This allows the driver to choose an amount of seat motion versus road-induced floor motion that is comfortable, and/or that is best for a particular roadway or a particular driving situation.

Figure 1:
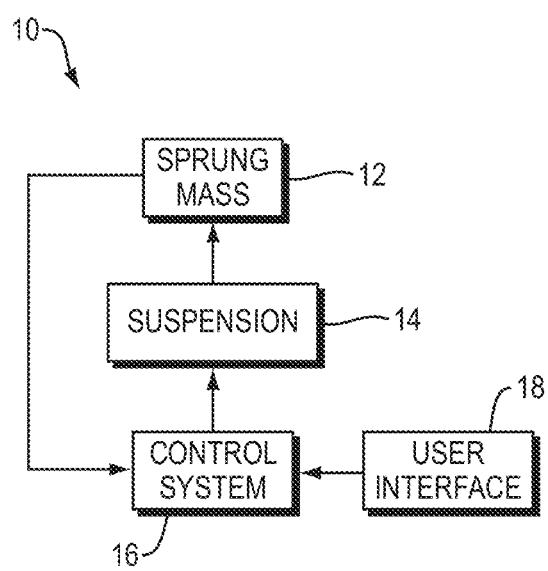
FIG. 1 is a block diagram of a variable tracking active suspension system.

FIG. 1 is a schematic block diagram of a variable tracking active suspension system 10. Variable tracking active suspension system 10 comprises active suspension 14, suspension control system 16 and user interface 18. Sprung mass 12 is typically any device that is coupled to a moving platform and is actively suspended with a suspension element that is controlled to achieve a particular suspension result. In one non-limiting example, the sprung mass is a device that is part of or carried by a moving platform such as a motor vehicle, train, airplane, boat or other means of conveyance that moves along (or below) the ground, or through the air or in or on the water and in which the device is suspended relative to the moving platform and the suspension system is active rather than purely passive.

Suspension 14 includes an actuator that is capable of outputting an arbitrary force. One particular non-limiting example of a sprung mass is a seat for the driver of a truck, with an active suspension that in part is designed to cancel or at least minimize the seat vibrations caused by the running engine and by movement of the truck over roadways. In this case, suspension 14 typically comprises an electromagnetic actuator with a linear output, such as a linear actuator. The electromagnetic actuator is capable of producing an arbitrary force on the sprung mass that is independent of the position, velocity or acceleration of the sprung mass. In some cases suspension 14 may also include a dynamically adjustable spring that is used as a force bias eliminator to maintain the system at equilibrium such that the electromagnetic motor is used primarily to counteract smaller perturbations. In one non-limiting example this variable spring is a low-stiffness spring. Active suspension systems are further detailed in U.S. Pat. Nos. 8,095,268 and 8,725,351, the disclosures of which are incorporated herein by reference.

Suspension control system 16 provides control signals that ultimately cause the electromagnetic actuator present in suspension 14 to exert force on sprung mass 12. User interface 18 comprises any means to allow user input so as to control certain aspects of system 10, and more particularly of control system 16. In one present non-limiting example, user interface 18 allows the user to select from two or more control presets, each of which establishes a different degree by which the sprung mass 12 follows motions of the unsprung mass. This aspect is further explained below.

Figure 2:
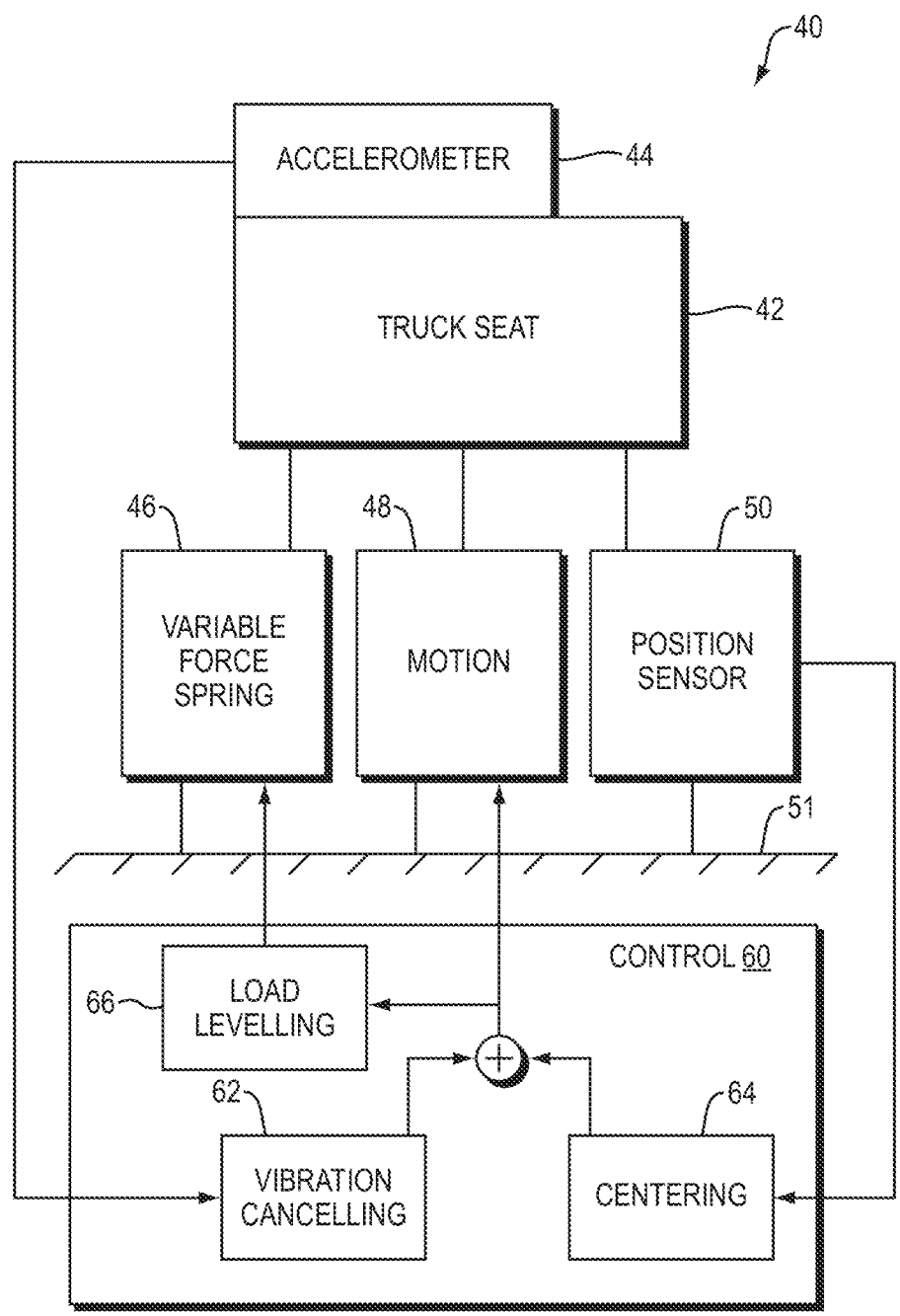
FIG. 2 is a block diagram of a variable tracking active suspension system.

Truck seat suspension system 40 is schematically depicted in FIG. 2. System 40 is a non-limiting example of a variable tracking active suspension system of the present disclosure. Truck seat 42 (which together with the driver sitting on the seat is the sprung mass) has accelerometer 44 coupled to it. The active suspension system comprises dynamically adjustable variable force spring 46 and electromagnetic actuator (motor) 48. Dynamically adjustable variable force spring 46 can be an air cylinder that acts as a force bias eliminator. Dynamically adjustable variable force spring 46 acts as a load leveling system whose goal is to reduce to zero the average force required to be output by the electromagnetic actuator. This can be accomplished by changing the pressure of a pneumatic cylinder using electric solenoids. Solenoid valves that are coupled to the truck's compressed air system can be controlled to vary the position and spring constant to offset DC or very low frequency (less than about 1 Hz) force requirements. Position sensor 50 measures the position of truck seat 42 relative to truck floor 51 (which is the unsprung mass). Vibration is induced in the truck cab floor 51 due to both operation of the truck engine and motion of the truck over a roadway. These motions are sensed using position sensor 50 that measures the relative position of the floor and the seat. Accelerations of the seat are measured by accelerometer 44. The sensor data from the accelerometer is used to cancel vibrations, and the position sensor data is used to keep the system in about the middle of its suspension system range, and for the variable tracking disclosed herein.

Control 60 (which may be implemented in a custom digital signal processor or the like) has a vibration cancelling function that is input with sprung mass acceleration from accelerometer 44. Centering function 64 is input with sprung mass position information from sensor 50. These signals are combined, and the combined signal is provided to load leveling algorithm 66 that controls variable force spring 46. The combined signal is also provided to motor 48, to cancel vibrations.

A user interface (not shown in FIG. 2) allows the driver sitting on seat 42 to adjust the degree to which the seat motion tracks or follows perturbations in the road. At one end of the control spectrum all or essentially all of the road perturbations are removed and the seat position remains essentially constant in space (but the seat height varies relative to the floor, leading to more leg motion). At the other end of the control spectrum the seat follows the road, so the seat height relative to the floor remains constant, leading to no leg motion but also no vibration isolation. Such variable tracking adjustment can be essentially continuous across some or all of this control spectrum. Alternatively or additionally the tracking adjustment can have a plurality of presets that are selectable by the user. The tracking can have a frequency dependence. The tracking can follow the floor at low frequencies and be independent of the floor at high frequencies.

In one non-limiting example control 60 comprises an algorithm that includes a position control loop that is involved in controlling the position of seat 42 relative to floor 51. The controller may be a PID controller, and the control algorithm may comprise proportional and derivative constants in the position loop. The user interface in this case can be operable to change the proportional and derivative constants in the position loop; this affects the amount of error that is allowed in the position loop. The user interface can but need not define at least two presets, one preset operable to change the control signals such that the motion of the seat (the sprung mass) closely follows the motion of the floor (the unsprung mass), and a second preset operable to change the control signals such that the motion of the seat less closely follows the motion of the floor. In one non-limiting example the user interface defines three presets, each preset operable to change the control signals such that the motion of the seat follows the motion of the floor to a different degree across the spectrum of possibilities. The presets can be user-selectable via any type of user interface. In a case in which there are a small number of presets, the user interface can be buttons that are touched or pushed, e.g., one button for each preset. Or the presets can be selected by turning a knob that has the appropriate number of detent positions. Another possibility to implement a continuous control would be to use a knob or slider, for example. The disclosure is not limited to any particular type of user interface nor is it limited to either continuous or discrete selection.

Figure 3:
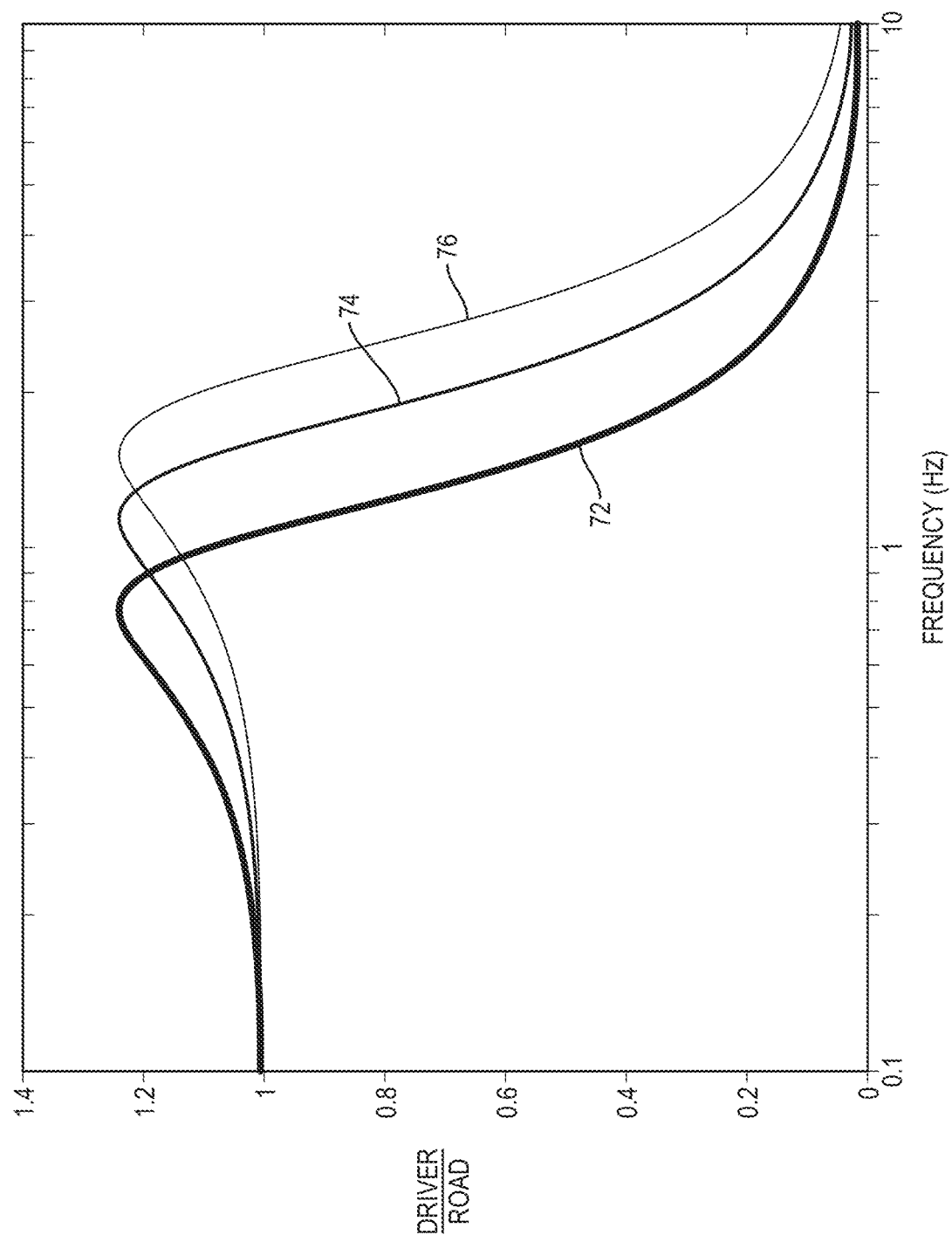
FIG. 3 illustrates operation of a variable tracking active suspension system.
Figure 4:
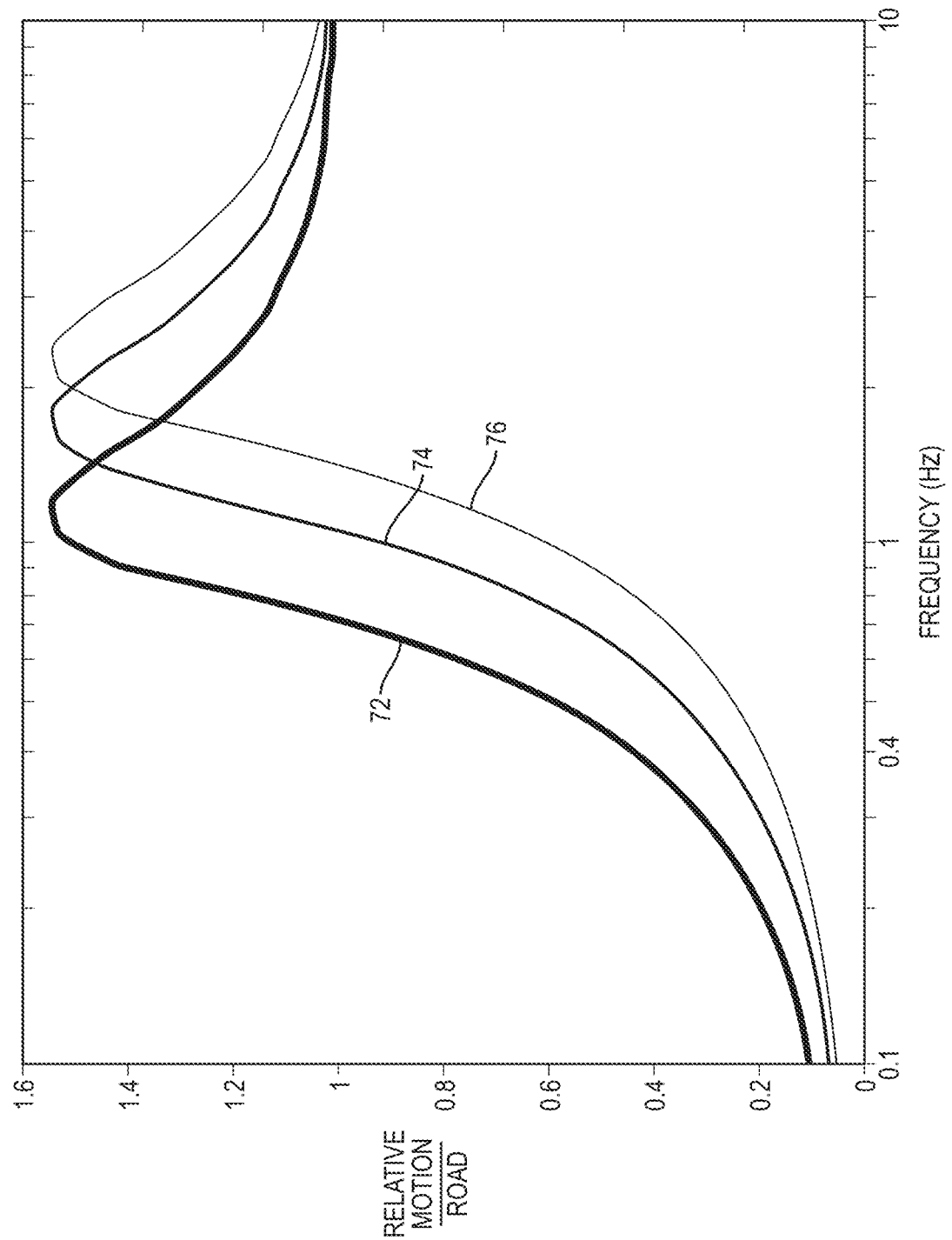
FIG. 4 illustrates operation of a variable tracking active suspension system.

FIGS. 3 and 4 are plots of suspension states versus the frequency of road perturbations for one non-limiting example of a variable tracking active suspension system with three preset selections of the P and D constants, and thus of the degree to which the seat motion follows road motion. Note that in this example only the seat position loop is involved; the seat acceleration control loop is not involved. One result is that the variable tracking active suspension system herein does not have much of a noticeable effect on vibration isolation at higher frequencies (such as over about 10 Hz) that are typically caused by the engine; such vibrations will still be damped or removed by the system.

FIG. 3 plots the motion of the driver (i.e., the sprung mass) divided by road motion on the y axis, and road perturbation frequency on the x axis. A value of 1 on the y axis indicates that the seat follows the road (thus there is no isolation from road perturbations), while values approaching 0 indicate greater isolation. Preset 72 accomplishes the best vibration isolation of the three presets, but the most relative seat motion, preset 76 accomplishes the worst vibration isolation among the presets but the least relative seat motion, and preset 74 is a middle ground. Note that the tracking is frequency dependent; the control affects how closely the sprung mass follows the unsprung mass only at low frequencies of up to about 10 Hz. As an example of the import of FIG. 3, consider behavior at 2 Hz, which is a common disturbance frequency of North American trucks. The difference in leg motion between presets 72 and 76 is almost four times; the presets thus allow the user substantial control over leg motion versus vibration isolation.

FIG. 4 is a similar plot, but the y axis in this case is the relative seat motion (i.e., seat motion minus road motion) divided by road motion. In this case y values approaching 0 indicate little or no isolation from road perturbations while values of 1 indicate complete isolation. To illustrate, at 0.4 Hz, preset 76 produces about half as much relative seat motion (and thus user leg motion) than preset 72. For users who prefer less leg motion, preset 76 may be a good choice. The subject variable tracking system thus allows the user to adjust the amount of leg motion that is incurred when the vehicle encounters road perturbations. The differences in leg motion among the three presets in the subject variable tracking active suspension system is most pronounced at frequencies of less than about 10 Hz, where most road perturbations of interest are found. For example, potholes typically create perturbations at around 2-4 Hz, truck wheel rotation can cause perturbations at around 8 Hz, while small rolling hills or rises in the road have a frequency of around 0.1 Hz.

There could of course be only two presets, or more than three presets. Also the control could be continuous, rather than stepwise control as shown in FIGS. 3 and 4. Continuous control could be provided for over only some of or over all of the range of variability of the position loop control. The control could also be partially continuous and partially stepwise.

Embodiments of the systems and methods described above comprise computer components and computer-implemented steps that will be apparent to those skilled in the art. For example, it should be understood by one of skill in the art that the computer-implemented steps may be stored as computer-executable instructions on a computer-readable medium such as, for example, floppy disks, hard disks, optical disks, Flash ROMS, nonvolatile ROM, and RAM. Furthermore, it should be understood by one of skill in the art that the computer-executable instructions may be executed on a variety of processors such as, for example, microprocessors, digital signal processors, gate arrays, etc. For ease of exposition, not every step or element of the systems and methods described above is described herein as part of a computer system, but those skilled in the art will recognize that each step or element may have a corresponding computer system or software component. Such computer system and/or software components are therefore enabled by describing their corresponding steps or elements (that is, their functionality), and are within the scope of the disclosure.

What is claimed is:

1. An active suspension system in a vehicle, with a sprung mass and an unsprung mass, the active suspension system comprising:
   at least one actuator operatively interposed between the sprung mass and the unsprung mass, wherein the at least one actuator is configured to apply a force on the sprung mass;
   at least one sensor responsive to acceleration of a mass, selected from the group consisting of the sprung mass and the unsprung mass, resulting at least partially from road induced perturbations; and
   a processor configured to control a motion of the sprung mass in a first frequency range by controlling the force applied by the at least one actuator in the first frequency range, based at least partially on information from the at least one sensor, and wherein the processor is configured to control the motion of the sprung mass in a second frequency range by controlling the force applied by the at least one actuator in the second frequency range based at least partially on information about a distance between the sprung mass and the unsprung mass, wherein the second frequency range is lower than the first frequency range.

2. The active suspension system of claim 1, wherein the sprung mass is a seat of the vehicle and the unsprung mass is a floor of the vehicle, and wherein the distance is between the seat and the floor.

3. The active suspension system of claim 2, wherein the at least one sensor includes an accelerometer.

4. The active suspension system of claim 3, further comprising a position sensor, wherein the position sensor is configured to measure the distance.

5. The active suspension system of claim 4, wherein the processor includes acceleration control loop and a position control loop, wherein the processor is further configured to control the motion in the first frequency range based on data from the accelerometer and in the second frequency range based on data from the position sensor.

6. The active suspension system of claim 5, wherein the processor is configured to receive a signal and based on the signal to alter a degree to which the seat tracks a motion of the floor in the second frequency range.

7. The active suspension system of claim 6, wherein the degree is determined by a value of a parameter of the position control loop.

8. The active suspension system of claim 7, further comprising a user interface, wherein the user interface is configured to provide the signal to the processor.

9. The active suspension system of claim 8, wherein the value of the parameter is selected from among multiple preset values based on the signal from the processor.

10. A method of operating an active suspension system in a vehicle, the method comprising:
measuring an acceleration of a mass selected from the group consisting of a sprung mass of the vehicle and an unsprung mass of the vehicle;
determining a distance between the sprung mass and the unsprung mass;
controlling an actuator, operatively interposed between the sprung mass and the unsprung mass, to apply a force on the sprung mass to control a motion of the sprung mass;
based on the measurement of the acceleration, controlling the force in a first frequency range to control the motion in the first frequency range; and
based on the determination of the distance, controlling the force in a second frequency range to control the motion in the second frequency range, wherein the second frequency range is lower than the first frequency range.

11. The method of claim 10, wherein the sprung mass is a seat and the unsprung mass is a floor.

12. The method of claim 11, wherein measuring the acceleration of the mass is measuring an acceleration of the seat.

13. The method of claim 12, wherein a position sensor is used for determining the distance.

14. The method of claim 13, wherein an accelerometer is used for measuring the acceleration.

15. The method of claim 14, further comprising tracking a motion of the floor with the seat, receiving a signal with a processor, and based on the signal, altering a degree to which the floor is tracked by the seat in the second frequency range.

16. The method of claim 15, further comprising producing the signal with a user interface.

17. The method of claim 16, wherein the processor includes a position loop with a parameter, wherein altering the degree to which the floor is tracked by the seat in the second frequency range is determined by a value of the parameter.

18. An active suspension system of a seat in a vehicle, the active suspension system comprising:
at least one actuator operatively interposed between the seat and a vehicle floor, wherein the at least one actuator is configured to apply a force on the seat;
at least one acceleration sensor configured to measure acceleration of the seat resulting at least partially from road induced perturbations;
at least one position sensor configured to measure a distance between the seat and the vehicle floor; and
a processor configured to control a motion of the seat in a first frequency range by controlling the force in the first frequency range based at least partially on the measured acceleration, and wherein the processor is configured to control the motion of the seat in a second frequency range by controlling the force in the second frequency range based at least partially on the measured distance, wherein the second frequency range is lower than the first frequency range.

19. The active suspension system of claim 18, wherein the processor includes a position loop and an acceleration loop, wherein the acceleration loop responds to input from the at least one acceleration sensor, and wherein the position loop responds to input from the at least one position sensor.

20. The active suspension system of claim 19, wherein the processor is further configured to receive information and to modify at least one parameter of the position loop based on that information.

\* \* \* \* \*